United States Patent
Belcea

(10) Patent No.: US 7,349,362 B2
(45) Date of Patent: Mar. 25, 2008

(54) METHOD AND SYSTEM FOR IMPLEMENTING THE TIME DIVISION MULTIPLE ACCESS METHOD TO AD-HOC MULTIHOPPING WIRELESS NETWORKS

(75) Inventor: John M. Belcea, West Melbourne, FL (US)

(73) Assignee: Meshnetworks, Inc., Mailtland, FL (US)

( * ) Notice: Subject to any disclaimer, the term of this patent is extended or adjusted under 35 U.S.C. 154(b) by 433 days.

(21) Appl. No.: 11/169,815

(22) Filed: Jun. 29, 2005

(65) Prior Publication Data

US 2007/0008947 A1    Jan. 11, 2007

(51) Int. Cl.
*H04B 7/212* (2006.01)
(52) U.S. Cl. ............... 370/321; 370/337; 370/347; 455/450; 455/464
(58) Field of Classification Search ........... 370/321, 370/337, 347; 455/450, 464
See application file for complete search history.

(56) References Cited

U.S. PATENT DOCUMENTS

| | | | |
|---|---|---|---|
| 5,408,506 A | 4/1995 | Mincher et al. | |
| 5,699,388 A | 12/1997 | Wang et al. | |
| 5,812,547 A | 9/1998 | Benzimra et al. | |
| 5,923,902 A | 7/1999 | Inagaki | |
| 5,943,322 A | 8/1999 | Mayor | |
| 6,069,887 A | 5/2000 | Geiger et al. | |
| 6,438,136 B1 | 8/2002 | Bahl | |
| 6,438,702 B1 | 8/2002 | Hodge | |
| 6,466,608 B1 | 10/2002 | Hong et al. | |
| 6,538,600 B1 | 3/2003 | Richton et al. | |
| 6,542,754 B1 | 4/2003 | Sayers et al. | |
| 6,546,026 B1 | 4/2003 | Goeddel | |
| 6,594,273 B1 | 7/2003 | McGibney | |
| 6,618,363 B1 | 9/2003 | Bahl | |
| 6,622,022 B1 | 9/2003 | Du | |
| 6,728,545 B1 | 4/2004 | Belcea | |
| 6,785,253 B1 | 8/2004 | Du | |
| 6,792,247 B2 | 9/2004 | Law et al. | |
| 6,807,165 B2 | 10/2004 | Belcea | |
| 6,873,839 B2 | 3/2005 | Stanforth | |
| 2002/0058502 A1 | 5/2002 | Stanforth | |
| 2003/0091010 A1 | 5/2003 | Garahi et al. | |
| 2004/0005902 A1 | 1/2004 | Belcea | |
| 2004/0190487 A1 | 9/2004 | Biggs | |
| 2004/0198363 A1 | 10/2004 | Zinn | |
| 2004/0246986 A1 | 12/2004 | Belcea | |
| 2004/0258013 A1 | 12/2004 | Belcea | |

(Continued)

OTHER PUBLICATIONS

DUST-Inc.com Technology Overview, no date.

(Continued)

*Primary Examiner*—Nghi H. Ly
(74) *Attorney, Agent, or Firm*—Randi L. Karpinia; Joseph J. Buczynski

(57) ABSTRACT

A system and method for synchronizing a wireless network comprising a first node operable pursuant to a first time-division multiple access (TDMA) scheme and a second node operable pursuant to a second TDMA scheme, wherein the first TDMA scheme and the second TDMA scheme each comprise a plurality of ticks, and wherein the first node and the second node each comprise a tick counter for determining the time moment at which a transmission is made or at which a signal is received by the node.

20 Claims, 9 Drawing Sheets

U.S. PATENT DOCUMENTS

2004/0259556 A1* 12/2004 Czys .................... 455/447
2005/0150505 A1    7/2005 Belcea
2006/0268792 A1* 11/2006 Belcea ................. 370/338

OTHER PUBLICATIONS

R. Baraniuk, Time Division Multiple Access (TDMA), no date.
R. Ramanathan & R. Rosales-Hain, Topology Control of Multihop Wireless Networks Using Transmit Power Adjustment, BBN Technologies (Div. of GTE), Cambridge MA 1997.
J.J. Garcia-Luna-Aceves & A. Tzamaloukas, Reversing the Collision-Avoidance Handshake in Wireless Networks, Baskin School of Eng., U. of CA Santa Cruz 1997.
C. Elliot & B. Helle, Self-Organizing, Self-Healing Wireless Networks, BBN Technologies, Cambridge, MA; IEEE, 2000.
J. Broch, et al., Performance Comparision of Multi-Hop Wireless Ad-Hoc Network Routing Protocols, Carnegie Mellon U., Pitts. PA, Proc. of the 4th Ann. ACM/IEEE Int'l Cnf. 1998.
C. Young, USAP:A Unifying Dynamic Distributed Multichannel TDMA Slot Assignment Protocol, Rockwell International, Richardson, TX, no date.
A. Kamerman & G. Aben, Net Throughput with IEEE 802.11 Wireless LANs, Lucent Tech., Nieuwegein, The Netherlands, no date.
J.J. Garcia-Luna-Aceves, Transmission-Efficient Routing in Wireless Networks Using Link-State Information, Baskin School of Eng., U. of CA, Santa Cruz, 1997.
J.J. Garcia-Luna-Aceves & E. Madruga, The Core-Assisted Mesh Protocol, Baskin School of Eng., U. of CA, Santa Cruz, 1997.
J.R. McChesney, et al., Optimization of an Adaptive Link Control Protocol for Multimedia Packet Radio Networks, ITT Indus. Aerospace Comm. Div., Ft.Wayne IN, 1997.
R. Ramanathan & M. Steenstrup, Hierarchically-Organized, Multihop Mobile Wireless Networks for Quality-Of-Service Support, BNN Systems and Tech., Cambridge, MA 1995.
M. Steenstrup, Dynamic Multipoint Virtual Circuits for Multimedia Traffic in Multihop Mobile Wireless Networks, BBN Tech., Cambridge, MA 1995.
Z. Tang & J.J. Garcia-Luna-Aceves, Collision Avoidance Transmission Scheduling for Ad-Hoc Networks, U. of CA Santa Cruz, 1997.
G. Vardakas, et al., QoS Networking with Adaptive Link Control and Tactical Multi-Channel Software Radios, Comm. Sys. Div. of Raytheon Systems Co., San Diego, CA 1997.
Royer, et al., A Review of Current Routing Protocols for Ad-Hoc Mobile Wireless Networks, University of California, no date.
J. Broch, et al., The Dynanmic Source Routing Protocol for Mobile Ad Hoc Networks, IETF MANET Working Group, Dec. 1998.
C. Perkins, et al., Ad Hoc On-Demand Distance Vector Routing, draft-ietf-manet-aodv-08.txt, Mobile Ad Hoc Networking Working Group, Mar. 2, 2001.
P. Jacquet, et al., Optimized Link State Routing Protocol, IETF MANET Working Group, Sep. 2, 2001.
D. B. Johnson, et al., the Dynamic Source Routing for Mobile Ad Hoc Networks, IETF MANET Working Group, Mar. 2, 2001.
Wong, et al., Soft Handoffs in CDMA Mobile Systems, IEEE Personal Communications, Dec. 1997.
Wong, et al., A Pattern Recognition System for Handoff Algorithms, Jul. 2000, IEEE Journal on Selected Areas in Communications, vol. 18, No. 7.
A. Valko, Cellular IP: A New Approach to Internet Host Mobility, Jan. 1999, ACM Computer Communications Review.
R. North, et al., Wireless Networked Radios: Comparison of Military, Commercial, and R&D Protocols, Feb. 28-Mar. 3, 1999, 2.sup.nd Annual UCSD Conf. on Wireless Comm, San Diego.
B. Peterson, et al., Spread Spectrum Indoor Geolocation, Aug. 1998, Navigation: Journal of the Institute of Navigation, vol. 45, No. 2, Summer 1998.

* cited by examiner

METHOD AND SYSTEM FOR IMPLEMENTING THE TIME DIVISION MULTIPLE ACCESS METHOD TO AD-HOC MULTIHOPPING WIRELESS NETWORKS

BACKGROUND OF THE INVENTION

1. Field of the Invention

The present invention relates to wireless communication devices organized as ad-hoc multihopping networks and, more particularly, to ad-hoc multihopping wireless networks that plan network transmissions in a Time Division Multiple Access (TDMA) manner.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells", as depicted in FIG. 1.

In recent years, the concept of meshed wireless networks has been developed. According with this concept, each node of the network has the capability to receive and transmit radio signals carrying digital information. From one perspective, it is similar with land networks where a multitude of nodes creates a mesh through which data packets are routed from source to destination. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

A wireless device operating in an ad-hoc multi-hopping network has three main components: the transceiver, a CPU, and a memory component, as depicted in FIGS. 2 and 3. The transceiver is a complex radio receiver/transmitter that receives and transmits signals from and to other devices in the network. The memory component holds instructions and data that the CPU uses for controlling the transceiver operations and for storing data to be transmitted or data that has been received. Depending on the functionality that the wireless device provides, it can be connected to a host, which in turn, could be connected to any network. For example, a mobile telephone is a wireless device, for which the host functionality is provided by a sound encoder and decoder. Moreover, handheld, laptop, and desktop computers can be hosts of wireless communication devices, which, in turn, provide those computers with wireless networking capabilities.

Many differences exist between land and wireless mesh networks. For example, in wireless networks, a radio transmission is received by all neighbors located within the propagation range and almost all nodes of the wireless networks are mobile. In wired land networks, all routes can be computed and stored in databases when the wires between nodes are installed. In wireless ad-hoc networks instead, the routes between two nodes that need to communicate have to be computed at utilization time (on demand) and maintained during the connection, due to the fact that any node along the link route can move out of the radio propagation range of neighbors, thus breaking the connection.

Because of the requirement to build network relations when they are needed, meshed wireless networks are called "ad-hoc networks." They are also called "multi-hopping" because the information, which is presented in packets of data, travels from source to destination in a "hopping" manner from one node to another along the route. Because of the capability of repairing broken routes, those networks are said to be "self healing". FIG. 4 illustrates an example ad-hoc network, in which devices 106-1-106-$n$ provide a wireless network with the connection to the world of communications. Because these devices use land interfaces, they are required to remain fixed. All other devices, however, can move in any direction as long as a path between devices soliciting communication can be built.

Several other differences exist between ad-hoc multi-hopping networks and cellular networks. In particular, for example, the mobility of ad-hoc networks requires that almost all nodes operate on batteries. Moreover, because each node has to support not only its own communication, but the communications between neighbors as well, ad-hoc devices have to transmit signals for longer intervals than regular cellular telephones. Therefore, to ensure that the device does not drain the battery too fast, the transmitting power of ad-hoc devices has to be much smaller than the transmitting power of regular cell phones. For this reason, the ad-hoc devices can communicate regularly at distances smaller than 1 km, compared with 10-15 km maximum range of cellular devices.

Important differences between ad-hoc multi-hopping networks and cellular networks are also derived from the fact that ad-hoc networks are "horizontal" with no hierarchical structure, while the cellular networks use the base stations as "the master" of the cell network. A first difference derived from the horizontality of the network relations is the fact that all devices operating in ad-hoc networks should use the same radio frequency in order to communicate one with another. A second difference is the fact that ad-hoc networks have to use distributed algorithms for managing the common resources, in opposition with cellular networks where the base station is responsible for collecting data about network activity and performing the management of resources.

More sophisticated ad-hoc networks are also being developed which, in addition to enabling mobile nodes to communicate with each other as in a conventional ad-hoc network, further enable the mobile nodes to access a fixed network such as those on the public switched telephone network (PSTN), and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. Pat. No. 6,807,165, entitled "Time Division Protocol for an Ad-Hoc, Peer-to-Peer Radio Network Having Coordinating Channel Access to Shared Parallel Data Channels with Separate Reservation Channel", and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

For some networks, where the throughput is not crucial to performance (such as, for example, in industrial telemetering), rough synchronization within the network can be satisfactory. Such rough synchronizations, however, fail to satisfy the requirements for supporting high throughput (e.g., hundreds of mega bits per second) for interactive voice and video communications or for file transfer. True high-precision synchronization, in this regard, has been identified for some time as being unachievable in ad-hoc networks. In fact, similar synchronization problems are encountered in radio networks using frequency hopping. In such networks, the receiver and transmitter change the transmitting and the receiving frequencies at the same moment, in order to ensure a continuous communication. Although, in this case the synchronization is required between two nodes only, the complexity of the problem is identified in U.S. Patent Application Ser. No. 20040198363, entitled "Wireless Device And Method Using Frequency Hopping And Sweep Modes", filed on Jan. 13, 2003, which presents a method for using frequency hopping without synchronization between a receiver and a transmitter.

Many references relate to the synchronization of devices in hierarchical wireless networks, where one or several synchronized masters operate as timeservers. U.S. Patent Application Serial No. 20040190487, entitled "Method For Synchronizing A Control Channel To A Working Channel", filed on Mar. 31, 2003, for example, relates to a method for synchronizing a control channel to a working channel, wherein the synchronization is "at bit level" which ensures a precision of about 7.5 ms. Moreover, U.S. Pat. No. 6,792,247 relates to a method for synchronizing reception in wireless networks, in which a "synchronization packet" of a special format is transmitted before a data packet is transmitted. U.S. Pat. Nos. 6,785,253 and 6,622,022 also disclose methods for synchronizing hierarchical wireless networks wherein at least one node is selected as the "central transfer node" or as the "main network node" which is responsible for providing frame synchronization services. Moreover, U.S. Pat. No. 6,546,026 relates to a method for improving the time synchronization in wireless applications (e.g., TDMA), which is applicable to base stations using an array of antennae for receiving and decoding signals from several sources simultaneously.

Methods for synchronizing cellular wireless networks using GPS timing signals can also be found in U.S. Pat. Nos. 6,542,754 and 6,538,600. Moreover, U.S. Pat. No. 6,466,608 relates to a synchronization method that requires defining a hierarchical structure of the network, wherein the synchronization process is controlled by assigned "master nodes." Moreover, a method for synchronizing the operation of end nodes in wireless LAN is presented in U.S. Pat. No. 6,069,887. Moreover, a method for correcting the ATM network synchronization with the round trip duration (similar with propagation time) is presented in U.S. Pat. Nos. 6,438,702. 5,923,902 relates to a method similar to those of the '702 patent, but wherein "round trip" is replaced by "time lag." Moreover, a similar method applicable to wireless LAN using frequency hopping is described in U.S. Pat. No. 5,408,506, wherein all messages have a field that contains the time when the message was transmitted. Moreover, U.S. Pat. No. 5,812,547 relates to a method for transmitting data packets in a wireless network, without dependence on fixed time slot or a central timing mechanism.

Methods for scheduling time slots and mini timeslots for supporting voice, video and data transmissions over a cellular communication network (e.g., GSM), are presented in U.S. Pat. Nos. 6,438,136 and 6,618,363. Moreover, U.S. Pat. No. 6,594,273 relates to a method for communicating in an ad-hoc multihopping network, wherein the network comprises active and passive terminals, and wherein only the active terminals participate in routing and synchronization. U.S. Pat. Nos. 6,807,165 and 5,699,388 present methods using a unique time source and propagating the synchronization in the network from upstream to downstream terminals. Moreover, U.S. Patent Application Serial No. 20040005902, entitled "System and method for correcting the clock drift and maintaining the synchronization of low quality clocks in wireless networks", filed Jul. 5, 2002, relates to a method that allows synchronization of terminals at any precision, using a "reference clock" that operates as a network master. All of the documents cited above are incorporated by reference herein.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 4:
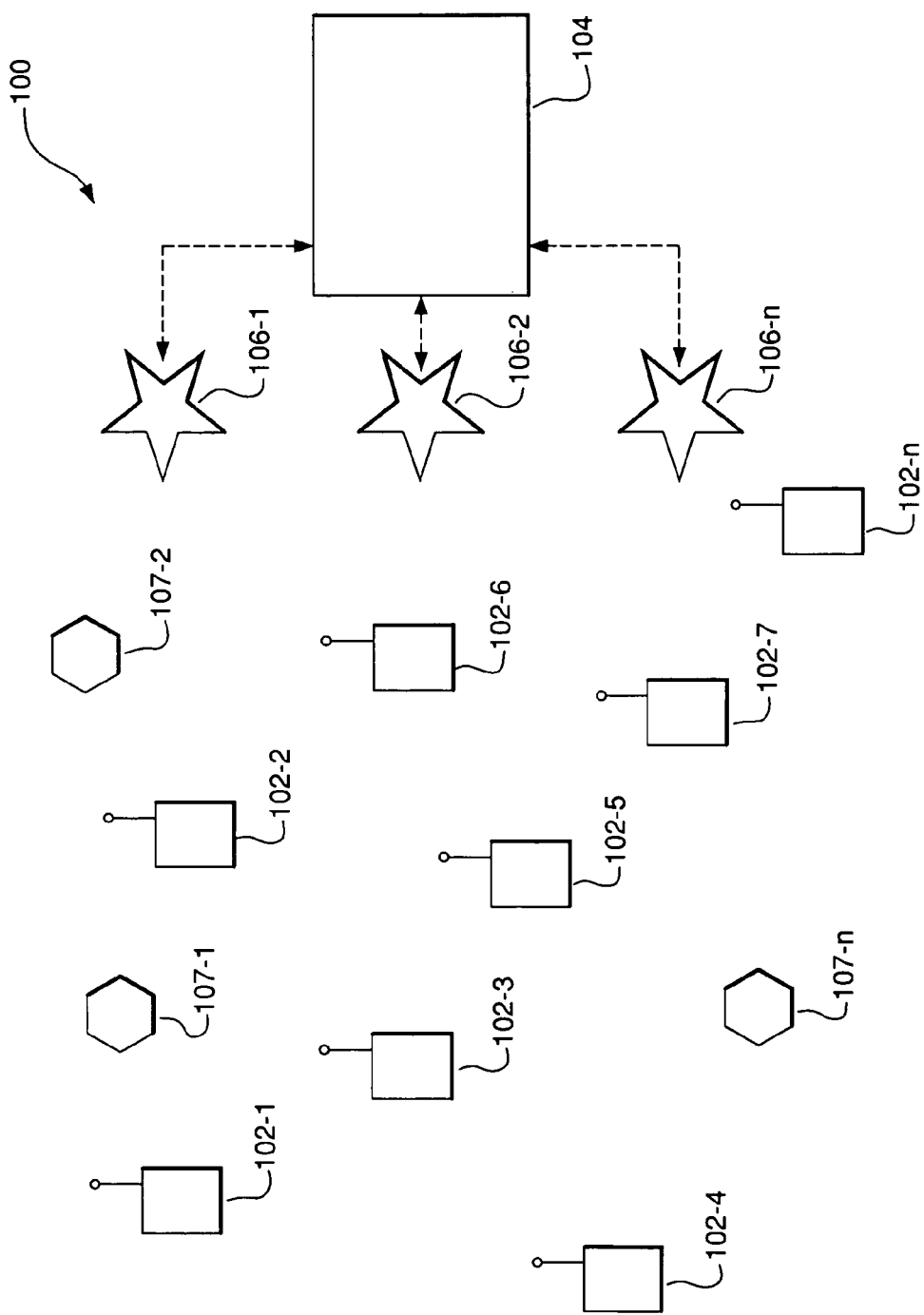
FIG. 4 is a block diagram of an example ad-hoc wireless communications network including a plurality of nodes employing a system and method in accordance with an embodiment of the present invention.

FIG. 4 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. Nos. 09/897,790, U.S. Pat. Nos. 6,807,165 and Ser. No. 09/815,164, referenced above.

Figure 1:
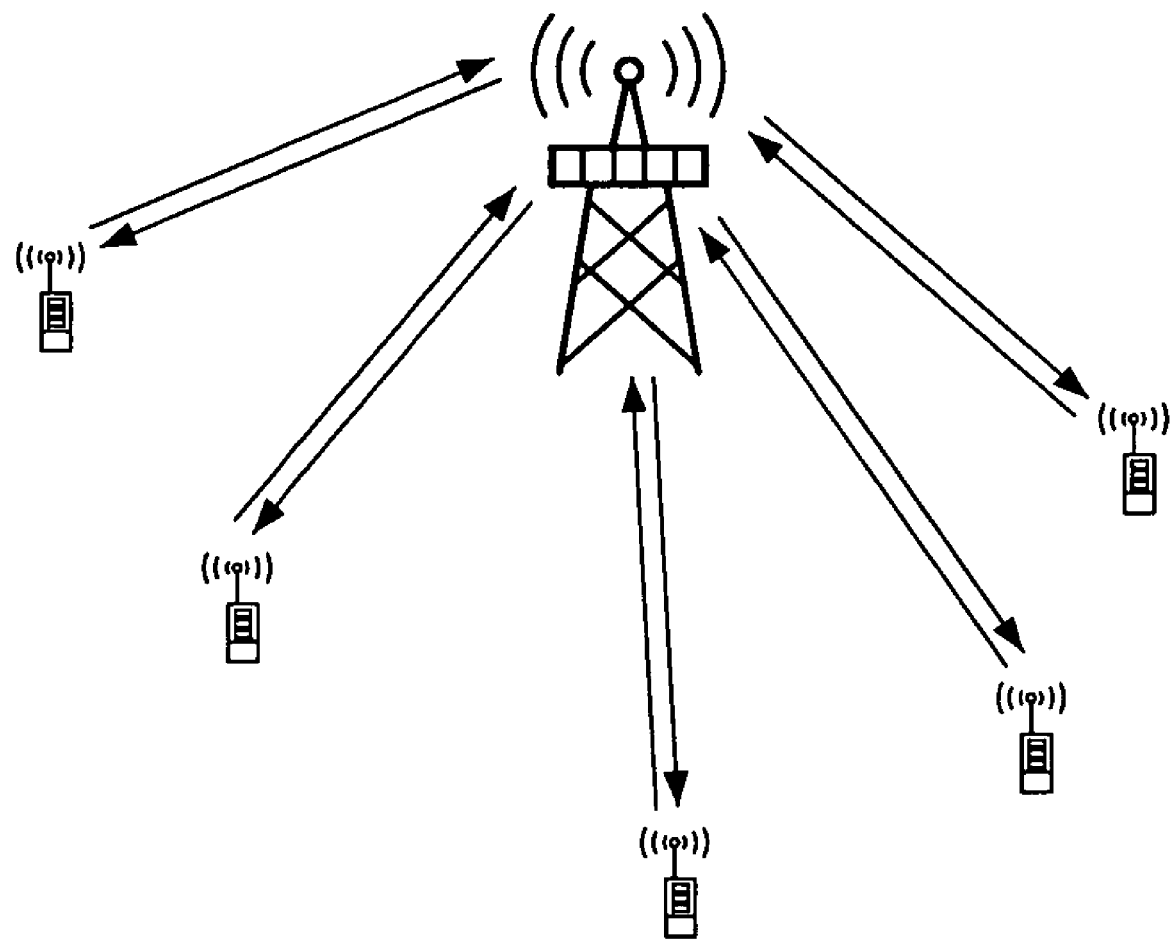
FIG. 1 is a block diagram of an example cellular wireless network.
Figure 2:
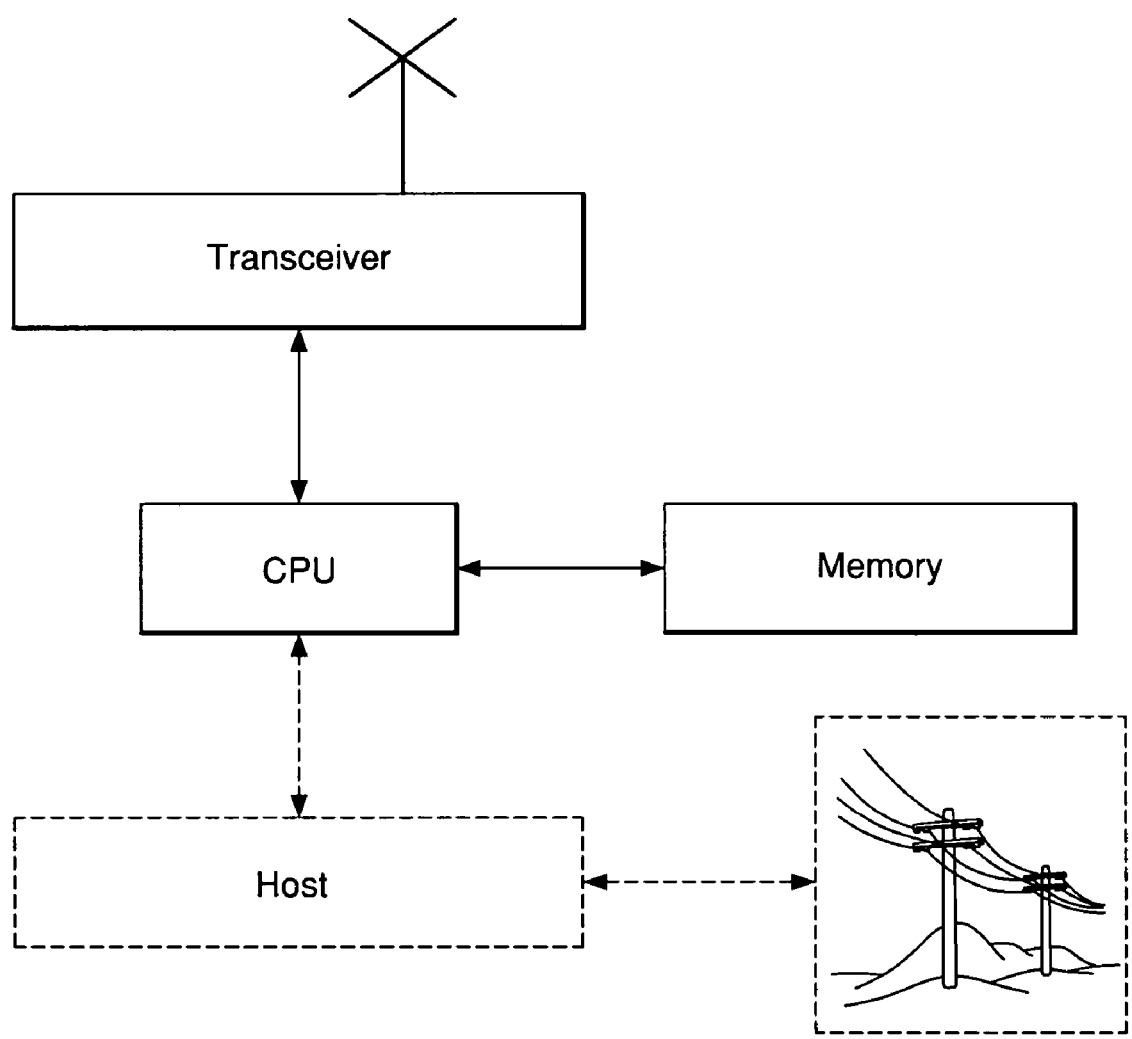
FIG. 2 is a conceptual block diagram illustrating an example of a mobile node employed in an ad-hoc network.
Figure 3:
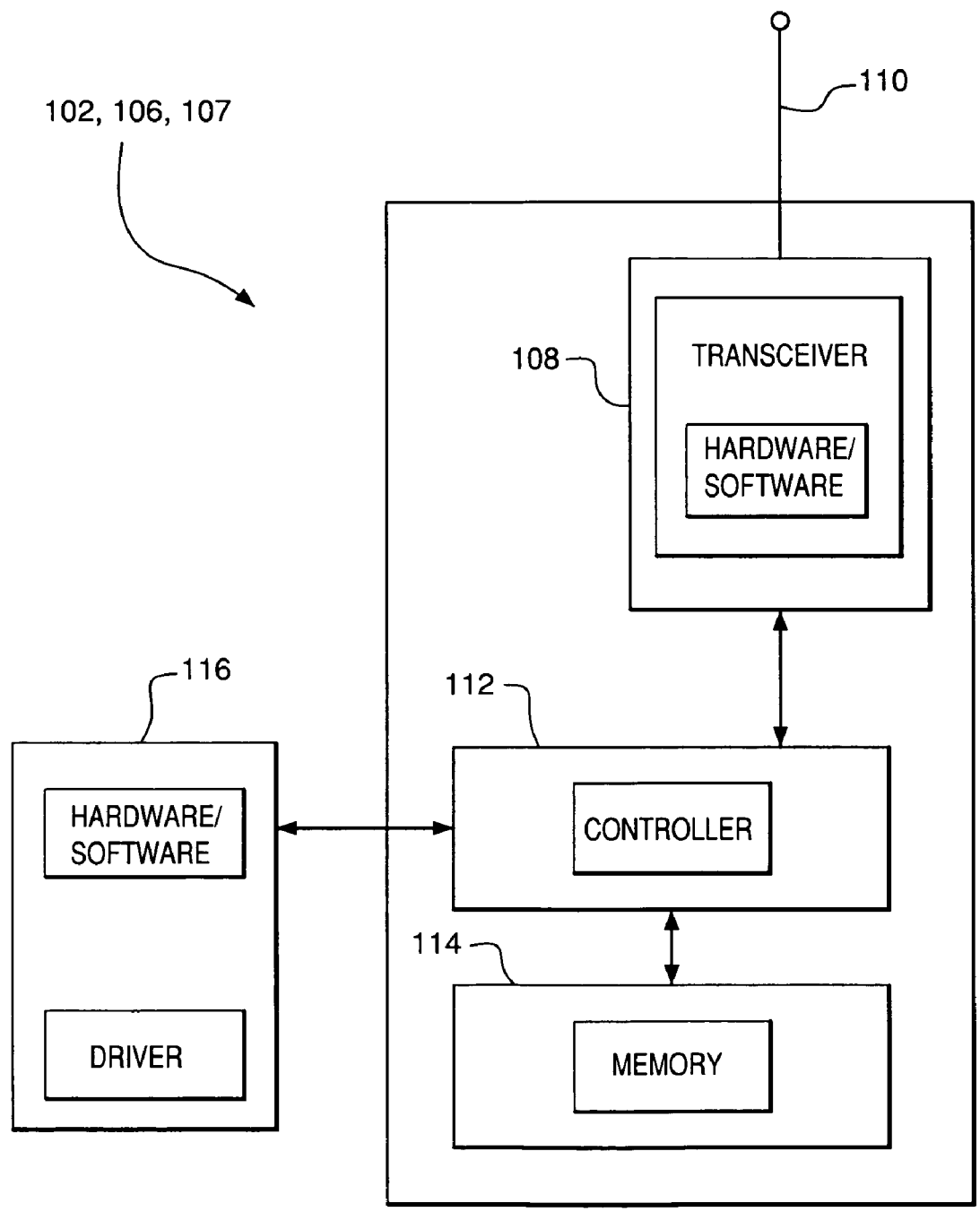
FIG. 3 is a block diagram illustrating another example of a mobile node employed in an ad-hoc network.

As shown in FIG. 3, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 3, certain nodes, especially mobile nodes 102, can include a host 116, which may consist of any number of devices, such as a notebook computer terminal, mobile telephone unit, mobile data unit, or any other suitable device. Each node 102, 106 and 107 also includes the appropriate software to perform Internet Protocol (IP) and Address Resolution Protocol (ARP), the purposes of which can be readily appreciated by one skilled in the art. The appropriate software to perform transmission control protocol (TCP) and user datagram protocol (UDP) may also be included.

As discussed in detail below, the present invention provides a system and method for synchronizing a wireless network comprising a first node operable pursuant to a first time-division multiple access (TDMA) scheme and a second node operable pursuant to a second TDMA scheme, wherein the first TDMA scheme and the second TDMA scheme each comprise the same plurality of ticks, and wherein the first node and the second node each comprise a tick counter for determining the time moment at which a transmission is made or at which a signal is received by the node. The method comprises (i) sending from the first node a reply-requesting message to the second node; (ii) determining a time of arrival (TOA) of the reply-requesting message at the second node, and sending from the second node a reply message to the first node, wherein the reply message comprises information as to the determined TOA of the reply-requesting message at the second node; (iii) determining a TOA of the reply message at the first node; (iv) comparing the determined TOA values for the reply-requesting message at the second node and for the reply message at the first node, and determining a synchronization correction value; and (v) if the synchronization correction value is greater than a pre-determined value, applying the synchronization correction value to the tick counter of the first node, such that the tick counter of the first node is synchronized with the tick counter of the second node.

The present invention also provides a node, adapted for use in a wireless network, and which is adapted to synchronize with a second node in the wireless network, wherein the node is operable pursuant to a first time-division multiple access (TDMA) scheme and the second node is operable pursuant to a second TDMA scheme, wherein the first TDMA scheme and the second TDMA scheme each comprise a plurality of ticks, and wherein the node and the second node each comprise a tick counter for determining the time moment at which a transmission is made or at which a signal is received by the node, the node comprising: a controller, adapted to (i) send a reply-requesting message to the second node, wherein the second node determines a time of arrival (TOA) of the reply-requesting message at the second node and sends a reply message to the first node, wherein the reply message comprises information as to the determined TOA of the reply-requesting message at the second node, (ii) determine a TOA of the reply message at the node by the second node, (iii) compare the determined TOA values for the reply-requesting message at the second node and for the reply message at the node, and determine a synchronization correction value, and (iv) if the synchronization correction value is greater than a pre-determined value, apply the synchronization correction value to the tick counter of the first node, such that the tick counter of the first node is synchronized with the tick counter of the second node.

1. Time Division Multiple Access

Figure 5:
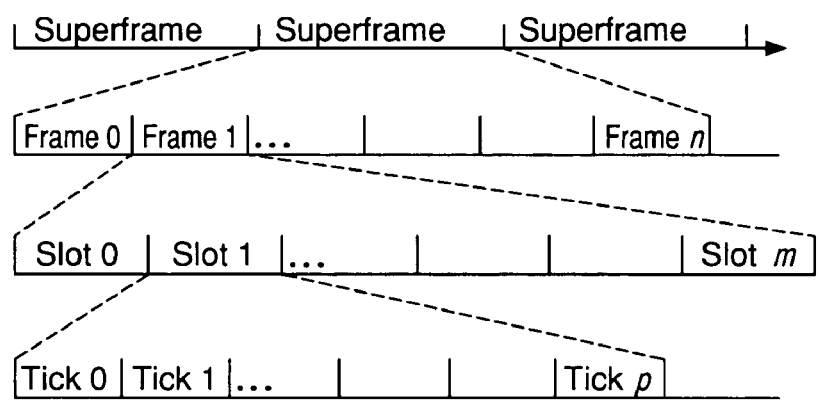
FIG. 5 is a diagram illustrating a time structure for use in a Time Division Multiple Axis (TDMA) comprising 4 units of time measure; namely, superframe, frame, slot, and tick, in accordance with an embodiment of the present invention.

A network operating in TDMA mode has to implement a "time structure." In everyday life, the time is measured in seconds, minutes, hours, days, years, centuries, etc. For the method of the present invention, the time is preferably measured in four units: superframe, frame, slot, and tick. As illustrated in FIG. 5, a "superframe", in this regard, is the largest time unit. Superframes are not numbered, which means that they cannot be identified from each other; the only differentiations between superframes made in the present method are the "current" superframe and the "next" superframe. The superframe is made from n successive frames, while a frame is a sequence of m successive slots. A "slot" is a sequence of p successive ticks, wherein a "tick" is the elementary time unit of the method. Frames, slots and ticks are numbered and can be identified individually. The terms "frame" and "slot" are time units and should not be confused with other meanings of the same words that are not associated with operations measuring the time.

A packet of data is transmitted during one slot for a particular number of ticks. In the method of the present invention, the transmission of data preferably starts in the same moment as the first tick of the slot and continues for as long as needed for transmitting the data packet at specified data rate. The size of the packet, in this regard, has to be computed, in order to ensure that after the transmission is complete, some amount of time is left unused in the timeslot.

Figure 6:
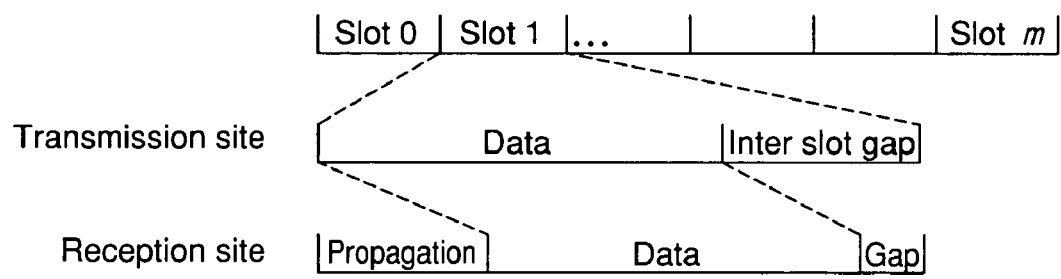
FIG. 6 is a diagram illustration an example scenario in which the receiving and transmitting clocks are synchronized and the data is transmitted at the beginning of the slot.

FIG. 6 illustrates a scenario in which the receiving and transmitting clocks are perfectly synchronized and the data is transmitted at the beginning of the slot. At the reception site, data is received with a delay caused by the propagation of radio signals between the transmitter and receiver. This propagation delay is about 3.3 µs for each km of distance. In this regard, any suitable slot assignment and planning of time slots to transmissions can be used in the context of multi-slot data transmissions. Moreover, as appreciated in the art, the efficiency of an ad-hoc multihopping network depends on the size of the "inter-slot gap", illustrated in FIG. 6, which is accepted when the method is implemented. The method of the present invention allows for implementation of inter-slot gaps that are as small as one clock tick or smaller (e.g., less than 1 ns in size) when used, for example, in the context of particular military and commercial applications.

The implementation of TDMA in non-hierarchical networks requires that all network nodes perform synchronized transmissions, for preventing any communication between any two nodes to cause radio interference to a third neighbor. For achieving the ad-hoc network synchronization, the method of the present invention does not use signals from any time base, such as, for example, GPS satellites. This capability makes the method suitable for implementation in any type of environment as underground, on narrow streets with tall buildings, under heavy foliage, indoors, etc. The method can provide synchronization of the network transmissions with an error smaller than one clock tick, regardless of the clock tick length: ms, µs, ns, ps, etc.

1.1. Cellular

The wireless Time Division Multiple Access (TDMA) was first introduced for optimizing the operation in cellular networks. According with this system, data is transmitted by a base station in one frequency in the form of packets that contain an identification of the destination. All subscribers receive these transmitted data packets, but ignore data addressed to other devices. Using the same frequency, the base station tells to each subscriber when it can transmit its data. As a result, all subscribers use the same transmitting frequency, but transmit only when the base station allows them to transmit. This planning of the transmission time makes it possible to use only one receiver and one transmitter at the base station and only one cellular channel (with two radio frequencies) for providing simultaneous service to a relatively large number of subscribers. As can be identified from FIG. 6, the size of the "inter-slot gap" is preferably at least equal with the propagation time between the transmitter and receiver, when the receiver and transmitter are fully synchronized.

Because devices operating in cellular networks do not provide information for computing the propagation range, the phone slot starts when the signal from the base station is received; therefore, the phone slot is delayed with the signal propagation time in relation with the base station slot. Accordingly, in order to allow the base station to receive the response from the mobile phone within the slot, the "inter slot gap" in cellular networks is preferably at least twice the propagation time. Moreover, for a base station covering a cell with 15 km radius, the "inter slot gap" for cellular networks must be at least 100 µs.

1.2. Ad-Hoc Multihopping

In ad-hoc multihopping networks, the transmission of data packets starts with the first tick of the slot. In order to take full advantage of the benefits of TDMA planning, the framing systems (tick number, slot number, frame number) of all neighbors must be synchronized within a specified precision.

The method of the present invention ensures full synchronization of the tick, slot, and frame numbers between neighbors, regardless of the propagation distance. Accordingly, when the synchronization is fully achieved, the slot of all neighbors will start within the duration of one tick only. Moreover, the size of the "inter slot gap" can be as small as the summation between 3.3 µs (the maximum propagation range) and a predefined synchronization precision.

2. The Timing System

The timing system is a component of a wireless device and has software and hardware components. The software component maintains the neighbor table, builds specific messages, and submits them to the modem for transmission. The hardware component (the timing device) is part of the transceiver; it has a set of registers that are used for communicating with the software component and another set of internal registers used for performing various operations. The timing system synchronizes the transmissions of network nodes, in order to allow the scheduling and the control of radio transmissions in TDMA manner for preventing interference.

2.1. Hardware

Figure 7:
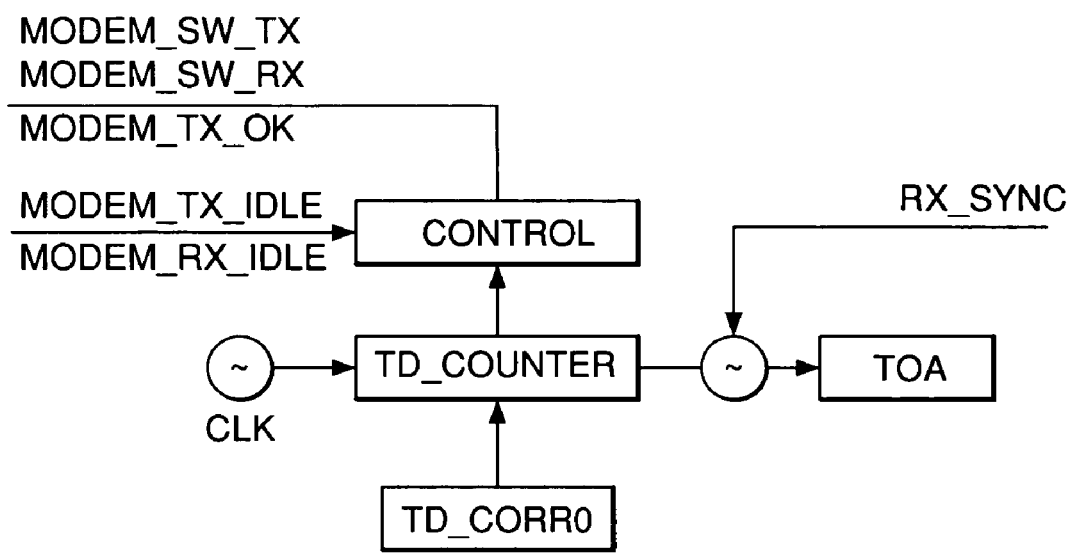
FIG. 7 illustrates the hardware components of a timing system which is specific to a system with no automatic drift control, in accordance with an embodiment of the present invention.

The hardware components presented in FIG. 7 are specific to a system with no automatic drift control.

The oscillator (CLK) of the timing device, which is independent of the RF oscillator, creates clock ticks that are counted by the TD_COUNTER.

The bits of the TD_COUNTER are organized as the tick counter (less significant bits), the slot counter, and the frame counter. The number of bits reserved for each sub-counter can be set when the device is turned on.

The TD_CORR0 register is used by software for recording any corrections to the TD_COUNTER register. The corrections that are stored in this register allow changing the value the TD_COUNTER register. The corrections applied to TD_COUNTER registers in network have the effect of making all counters in the network to show the same value at any moment with a precision smaller than of±one tick.

2.1.1. Hardware Operation

When a receiver identifies the synchronization with the received RF signal, it preferably generates an RX_SYNC message. The synchronization moment of the receiver to the received signal is usually identified with an impulse response filter or using another method. The RX_SYNC signal causes the content of the TD_COUNTER to be copied into the TOA register. The software can read the TOA register when needed.

The CONTROL of the timing device is responsible for generating signals that control the operation of the transceiver modem. The transceiver modem could be transmitting, receiving, or "sleeping". The planning of the modem sleeping state is not covered in this document. For this reason, it is considered that the transceiver modem is either receiving or transmitting. When the modem is in "listening" mode (receiving mode idle state), it sets the signal to MODEM_RX_IDLE. When the current timeslot is almost over, the timing device checks the plan to see if there is any data to be transmitted in the next time slot. If such data exists, it sets the signal to MODEM_SW_TX, which causes the modem to switch to transmit mode. When the modem enters the "idle" state in transmit mode, it sets the MODEM_TX_IDLE signal. When the timing device starts a new timeslot, and the modem is in transmit mode idle state, it sets the signal to MODEM_TX_OK, which tells the modem to start transmitting. The timing device checks for data to be transmitted at a moment which is suitable number of ticks prior to the expiration of the current timeslot for the modem to have time for switching between receiving and transmitting modes.

While the modem is transmitting, the timing system preferably checks if there is any data to be transmitted in the next timeslot. The timing system, in this regard, sets the signal to MODEM_SW_TX or to MODEM_SW_RX, depending on whether there is data to be transmitted or not. After finishing the current transmission, the modem switches to the proper mode, in accord with the signal set by the timing system, and sets the MODEM_TX_IDLE or the MODEM_RX_IDLE signal.

When the software identifies the need to make corrections to the TD_COUNTER register, it records the correction into the correction register TD_CORR0. The device then adds the correction to the TD_COUNTER when the content of the register is equal to one. In this manner, the software prevents missing the beginning of a timeslot, which triggers the beginning of the transmission of a message.

2.1.2. Hardware State Machine

Figure 8:
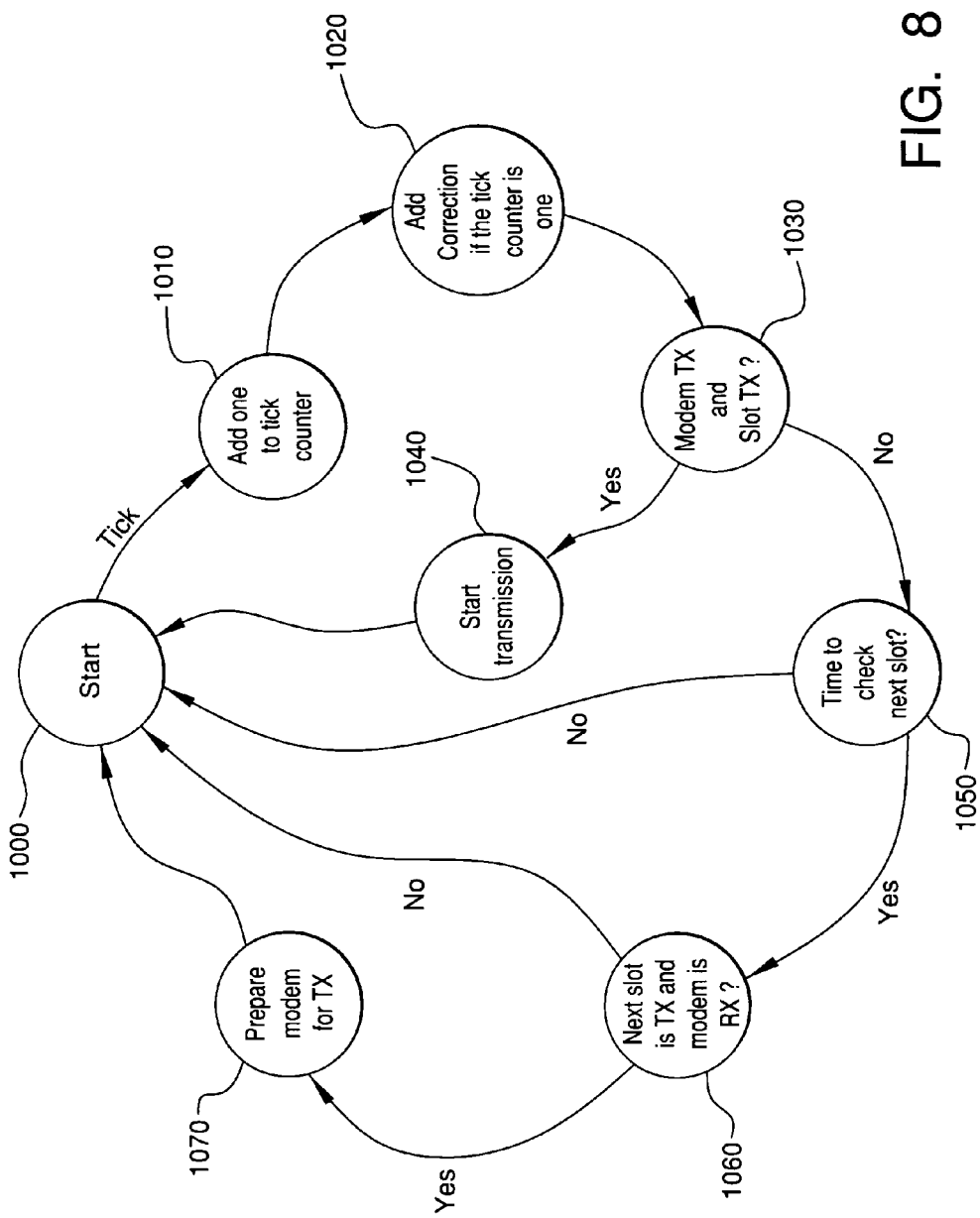
FIG. 8 is a state chart showing an example of operations in the hardware component that controls the timing system, in accordance with an embodiment of the present invention.

FIG. 8 illustrates a sequence of states of the framing hardware, in accordance with an embodiment of the present invention.

Start

When the hardware is started, it is in a "Start" state in step 1000 of FIG. 8. At this time, all registers have random content.

Add One to TD_COUNTER

When a tick is received from the oscillator, the content of the register is increased by one unit in step 1010.

Add Correction if the Tick Counter is One

If the bits of the tick counter are equal to one, the correction is added to the TD_COUNTER in step 1020 and the TD_CORR0 register is cleared.

Modem TX, Slot TX and Counter is Zero

In step 1030 is checked whether the modem is in transmit mode idle state (signal MODEM_TX_IDLE is on), the next slot requires transmission, and the slot bits of the counter are all zero.

Start Transmission

In step 1040 the timing device sets the MODEM_TX_OK signal that tells the modem to start transmitting.

Time to Check the Next Slot?

In step 1050 is checked if now is the correct time for checking if the next timeslot requires transmission or reception.

Next Slot is TX and Modem is RX?

In step 1060 is checked if the modem is in the receive mode and the next slot requires transmission. If the answer is negative, the hardware moves to Start state (step 1000).

Prepare Modem for TX

In step 1070 the device sets the signal MODEM_SW_TX preparing the modem for transmission.

2.2. Software

The software component of the timing system is responsible for building the proper messages that are exchanged with neighbors for achieving the synchronization of the tick counter. It operates as a low priority task and its operation is started when it is identified that a message from any neighbor has been received too soon or too late.

2.2.1. Data

The software component of the timing system maintains a neighbor table TD_NBR, with timing information about all neighbors, and with the following content:

Neighbor identification
Time of Arrival (TOA) of the last received message
The TD_COUNTER shift relative to neighbor
Propagation to neighbor (in ticks)

The "neighbor identification" is the information that identifies each node in the network. The "TOA of last received message" is the time of arrival provided by the receiver. The "TD_COUNTER shift relative to neighbor" contains the difference between the content of the local TD_COUNTER and the TD_COUNTER reported by the neighbor in the last timing message. The signal propagation time to the neighbor is measured in oscillator ticks. The latter two fields, in this regard, are computed in accordance with the synchronization algorithms, discussed below in Section 3.

2.2.2. Framing Messages

The method of the present invention preferably uses only one framing message TD_SYNC that is broadcast (a) periodically, (b) when needed, or (c) on the request of other neighbors. The message preferably has the following fields:

Reply requested (one bit)
Identification of the node transmitting the message
Transmission time
Number of the neighbors in the list
List of neighbors
  Neighbor identification
  TOA of the last received message from neighbor The "reply requested" bit, in this regard, is set when the transmitting station encounters large timing errors in relation to at least one neighbor. All stations receiving the message with the reply request set, should reply to it. The "transmission time" is identified by the timeslot number and the timeframe number. Since those numbers are known before the transmission takes place, they are recorded in the message by software when the message is built. The value, in this regard, corresponds to the moment when the transmission of the message must be performed.

The message is a broadcast when the first terminal requests reply for correcting its clock. The responses are multicast addressed to all terminals in the list.

2.2.3. Operation

The node receiving the TD_SYNC message, updates the entry of the transmitting neighbor in TD_NBR table recording the timing (TOA) of the message. If the message is a reply to a previous TD_SYNC request, the "range to transmitting neighbor" and its clock shift are computed.

Preferably, once per timeframe, the node computes its own clock correction from the clock shift of all neighbors. The TD_COUNTER correction can be recorded in the TD_CORR0 hardware register and all entries in the TD_NBR table can be updated accordingly. This causes the TD_NBR table to show the presumed value of TOA after the local TD_COUNTER has been corrected.

If the correction of the node's own clock is larger than the allowed precision, a TD_SYNC message with reply request can be submitted. If the correction is small, but the node has received a TD_SYNC requesting reply, a TD_SYNC without reply request can be transmitted. If the correction is small and no reply request has been received, then preferably no message is transmitted.

In the event that the list of neighbors is too large and cannot fit in one message, when replying to a request, the terminal can (a) select at random only some of the neighbors, (b) transmit more than one reply, or (c) use a multi-slot transmission.

Each TD_SYNC message can be transmitted in such manner that the time passed between two transmissions is larger than the size of the timeframe. This allows each node to listen to all its neighbors before computing the corrections and transmitting the reply.

When TD_SYNC is a reply to multiple requests, the list of neighbors should contain all neighbors that nave been requesting replies.

When TD_SYNC with a reply request set is transmitted, the list preferably contains data from those neighbors having large errors.

The TD_SYNC with reply request, preferably, is also transmitted periodically for tuning the automatic drift correction.

2.2.4. Software State Machine

Start

Figure 9:
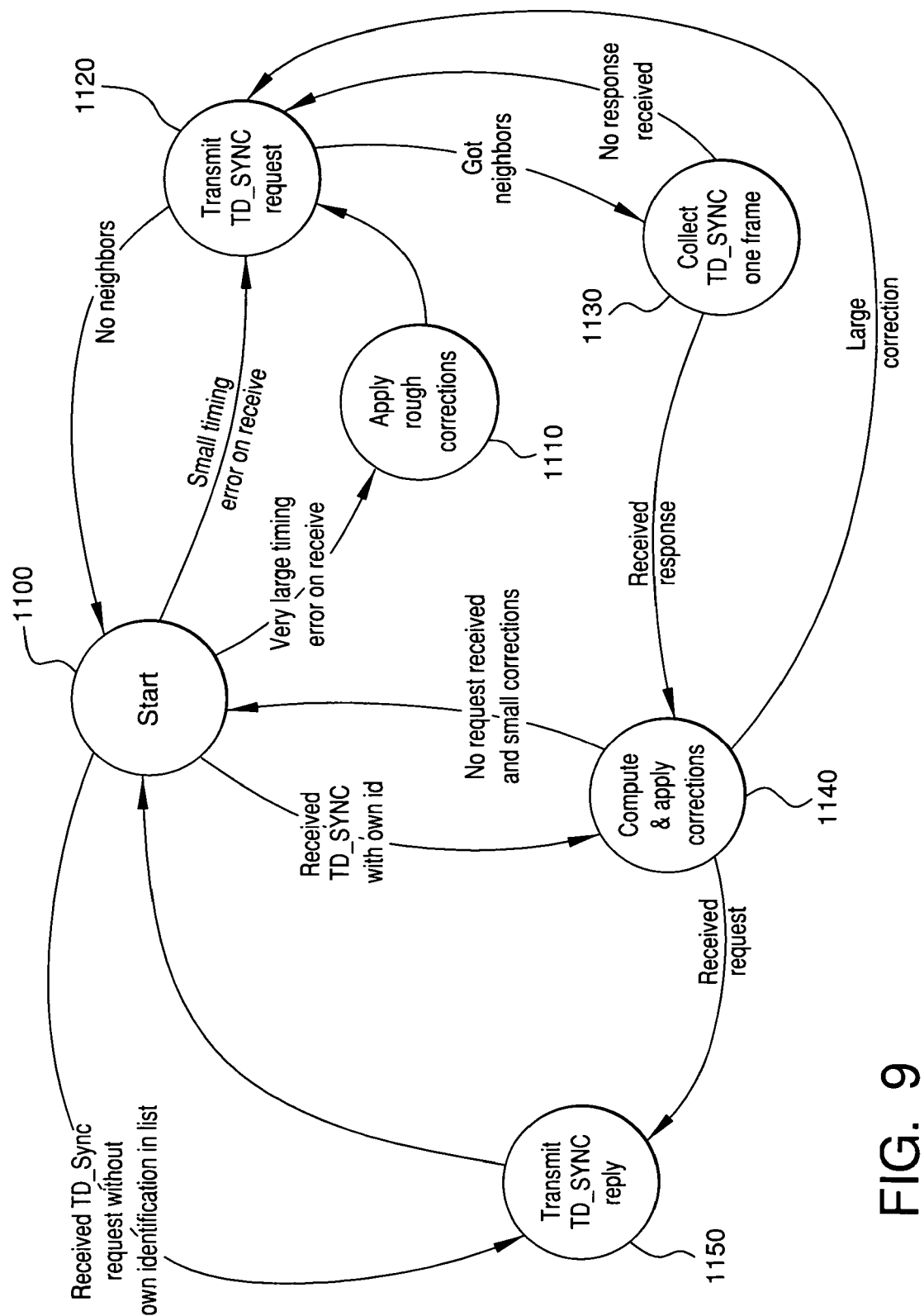
FIG. 9 is a state chart showing an example of operations performed in the software component of the timing system, in accordance with an embodiment of the present invention.

As depicted in FIG. 9, when the terminal power is turned on, the software task is in a "Start" state in step 1100. In this state, the timing system records, in the TD_NBR table, the TOA of messages received from neighbors.

Since the transmission of any message is executed when the tick counter of the transmitting site is at null, if the network is synchronized, the value of the tick counter at the receiving site must be as large as is the signal propagation time between the transmitting neighbor and the receiver.

If the difference between the message TOA and neighbor range is smaller than the half of synchronization precision, the task remains in the "Start" state.

If the difference is larger than the half of synchronization precision, but smaller than the synchronization precision, the task preferably continues with a "Transmit TD_SYNC request" in step 1120, discussed below. Moreover, the software should also switch to a "Transmit TD_SYNC request" State when tuning the drift correction is planned.

If the difference is larger than the synchronization precision, the task preferably changes the state to a "Apply Rough Corrections" state in step 1110, discussed below.

If, while in "Start" state, the node receives TD_SYNC, it preferably changes the state to a "Transmit TD_SYNC Reply" step 1150 or to a "Compute & Apply Corrections" state in step 1140, both discussed below, depending on the value of the request bit in the message and on the presence of own identification in the received TD_SYNC message.

Apply Rough Corrections

If the differences between the TOA and the ranges of terminals from where data was received are larger than the synchronization precision, a rough correction is preferably applied to hardware counters in step 1110.

The correction is computed to compensate for the average neighborhood errors.

Transmit TD_SYNC Request

If the station does not have any neighbor in the list, it returns to the "Start" state in step 1120. If the neighbor list is not empty, the terminal transmits the TD_SYNC message requesting reply.

Collect TD_SYNC for One Frame

The terminal preferably collects TD_SYNC messages from all neighbors at least for the duration of one frame in step 1130. If no message is received during the frame, the task returns to previous state in step 1120, checking if any neighbor is still left in the table or they are all gone. During the waiting period, the TD_NBR table may be updated, old neighbors may be removed, and new neighbors may be added.

Compute & Apply Corrections

If at least one TD_SYNC has been received, the task preferably computes and applies the corrections in step 1140. The synchronization corrections are computed using the algorithms, discussed below.

If all received TD_SYNC messages are replies (no request) and the computed correction is smaller than the synchronization precision, the task returns to the "Start" state in step 1100. If corrections are large, the task returns to state "Transmit TD_SYNC request" in step 1120 for exchanging another set of synchronization messages.

Transmit TD_SYNC Request/Reply

If the last applied correction was smaller than the half of synchronization precision and last received TD_SYNC message requested reply, the terminal preferably builds the TD_SYNC reply message in step 1150, including only data for those neighbors that have requested replies.

The task returns to the "Start" State in step 1100, discussed above.

3. Synchronization Algorithms

3.1. TOA, TOF, and Clock Shift

When the transceiver modem is in a "receiving" mode and identifies a radio signal, it preferably synchronizes on the carrier frequency and identifies the best "finger" for decoding the data. When the best finger is found, the synchronization is achieved and the modem preferably generates a signal that causes the TD tick counter to be saved into the TOA register.

When the transceiver modem is in a "transmitting" mode, the transmission starts when the tick counter is equal with zero.

If the counters at transmit and receive sites are perfectly synchronized, then the tick counter at the receiving site is also zero when the transmission starts, and the value of the TOA of a message is be the same as the signal propagation time. Unfortunately, the counters of all network terminals do not show the same value at the same moment. Even more, each oscillator generating the TDMA ticks has a slightly different frequency from node to node, causing the tick counters that have been initially synchronized, to slowly slide away one from another.

The algorithms used in the context of the present invention allow for the synchronization of network clocks, identify the effect of the drift of each oscillator in relation with the network, and correct the content of the tick counter according with the identified drift.

3.2. Two Terminals

The clock counters of terminals A and B show, at one moment, values $t_A$ and $t_B$. The shift of the counter of terminal B in relation to the tick counter of terminal A is $d_{BA}=t_B-t_A$. In this regard, the shift of the tick counter of terminal A in relation with the tick counter of terminal B, $d_{AB}$, has the value $d_{AB}=t_A-t_B=-d_{BA}$.

When terminal A starts transmitting a message, its tick counter preferably is zero. Accordingly, the counter at terminal B preferably shows $d_{BA}$.

The message arrives at terminal B after p ticks, which is equal with the propagation time of the radio signal between nodes A and B. At that moment, the tick counter at terminal B should show the value $TOA_{BA}=d_{BA}+p$. This value is identified as the "time of arrival" of the signal at node B, for the message that has been transmitted by node A. After few time slots, terminal B preferably transmits the "reply" message.

At the transmission moment, the tick counter at terminal B is zero, while the tick counter at node A shows $d_{AB}=-d_{BA}$. Supposing that the signal propagation time is the same, A records $TOA_{AB}=-d_{BA}+p$ when it receives the signal from B. If node B has included the value $TOA_{BA}$ in the transmitted message, then node A should have enough of the data for computing both the propagation time and its clock shift in relation with node B.

$$p = \frac{TOA_{AB} + TOA_{BA}}{2} \qquad \text{Equation 1}$$

$$d_{AB} = -d_{BA} = \frac{TOA_{AB} - TOA_{BA}}{2}$$

If node A applies the computed correction to its tick counter, the counters operating on both nodes will become synchronized (will show the same value at any moment). Once the counters are synchronized, the TOA at both sites should be equal with the duration of signal propagation between terminals.

3.3. Network

When a terminal operates in a network, it should be simultaneously synchronized with all or substantially all neighbors. Such simultaneous synchronization would be possible only if all neighbors are also synchronized one with another.

The algorithms presented here are distributed, in that each node synchronizes to a "virtual neighbor", which then causes all nodes of the network to get synchronized with each another.

3.3.1. Averaging

The first method used for network synchronization uses the average value of a set of computed corrections. In particular, a non-synchronized terminal A transmits a TD_SYNC message, which requests neighbors to answer. Some neighbor i collects the value $TOA_{Ai}$, when it have received the TD_SYNC message transmitted by terminal A. Neighbor i answers back with the TD_SYNC reply message including the $TOA_{Ai}$ value in message. The reply message is received by node A that measures the time moment when the response was received $TOA_{iA}$. From the messages received from n neighbors, the terminal computes the average correction, in accordance with the following equation:

$$\delta_A = \frac{\sum_{i=1}^{n} d_{Ai}}{n} = \frac{\sum_{i=1}^{n} \frac{TOA_{Ai} - TOA_{iA}}{2}}{n} \quad \text{Equation 2}$$

Terminal A applies the computed correction $\delta_A$ to its tick counter. After applying this correction, the terminal is synchronized to the network, but only if all other neighbors were already synchronized. If they were already synchronized, all $\delta_{Ai}$ values must be substantially equal with the average value $\delta_A$. If the differences between individual corrections $\delta_{Ai}$ are too large, then the terminal preferably transmits the TD_SYNC message again, requesting reply. Large differences between individual corrections, in this regard, indicate that the other neighbors are not synchronized. In such a condition, at least one of the neighbors identifies also the large difference and preferably transmits also the TD_SYNC message requesting reply.

The stability of a system is a very important concern associated with distributed algorithms. Since each system component collects data and computes corrections at different moments and independently of others, it is possible that the whole system could start to oscillate or to drift, without achieving the synchronization at requested precision. In this particular case, the network stability would be reflected by the fact that, while computing and applying iteratively corrections to tick counters, the network counters either would not shift continuously in one direction, or would not oscillate between particular values.

In a closed network with n+1 nodes, each node can hear all other nodes and has n neighbors. The synchronization correction at node k for step (timeframe) s is $\delta_k^{(s)}$, which is calculated in accordance with the following equation:

$$\delta_k^{(s)} = \frac{1}{n} \sum_{\substack{i=1 \\ i \neq k}}^{n+1} d_{k,i}^{(s)} = \frac{1}{n} \sum_{\substack{i=1 \\ i \neq k}}^{n+1} \frac{TOA_{k,i}^{(s)} - TOA_{i,k}^{(S)}}{2} \quad \text{Equation 3}$$

Most networks extend across an area that is much larger than the coverage of one individual node. In such a scenario, each node k has a specific neighborhood of size $n_k$, and the neighborhoods may be different from node to node. For large networks, the synchronization correction at step s which is applied to the tick counter of node k is calculated in accordance with the following equation:

$$\delta_k^{(s)} = \frac{1}{n_k} \sum_{i=1}^{n_k} \delta_{k,I_k[i]}^{(s)} = \frac{1}{n_k} \sum_{i=1}^{n_k} \frac{TOA_{k,I_k[i]}^{(s)} - TOA_{I_k[i],k}^{(s)}}{2} \quad \text{Equation 4}$$

In Equation 4, $I_k$ is the list of indices of all neighbors of node k. The list $I_k$, in this regard, has the length $n_k$ and does not include node k. In this list, a particular neighbor is identified by $I_k[i]$.

For a network with N nodes, the corrections at timeframe s verify the following relation:

$$\sum_{k=1}^{N} n_k \delta_k^{(s)} = 0 \quad \text{Equation 5}$$

3.3.2. Ad Hoc Synchronization Reference

An embodiment of the present invention comprises identifying one network terminal designated for acting as a synchronization server. The synchronization reference, in this regard, can be predefined at installation time or it can be "elected" at a later point, based on any suitable criterion, such as, for example, MAC address, terminal serial number, or clock values. Preferably, in this regard, only one reference per network is defined for implementation of the predefined method. Moreover, if the server becomes unavailable, or the network fragments because of mobility, then manual intervention may be required for defining another reference.

"Election" of a synchronization reference may be preferable in the context of ad-hoc self-healing networks. In particular, each terminal broadcasts messages describing the entity that is used as selection criterion, and each node elects as reference the node that provides the best match for the criterion. Those nodes which have achieved synchronization, retrieve the criterion attribute from the direct reference node and broadcast it, in order to invite other nodes from the network to synchronize to them. In this manner, a tree is built, in which the root is the terminal with the smallest or largest MAC address, for example. Again, if the node providing synchronization becomes unavailable, or if the network breaks, a new node must be selected.

Using of the size of clock correction as an election criterion can be more efficient than any other method, because it does not require broadcasting any supplemental information. According with this method, a terminal A submits to neighbors a request for synchronization TD_SYNC. The neighbors respond to the message with TD_SYNC, providing terminal A with data for computing the correction to each neighbor $\delta_{Ai}$. Terminal A then applies to its tick-counter either the most positive or the most negative $\delta_{Ai}$ correction, thus becoming synchronized with one neighbor. Each node in the network preferably performs the same operation at randomly selected timeslots, until the network becomes synchronized.

Selection of the neighbor associated with the most positive or with the most negative correction is an elective process. It is preferable, in this regard, that all nodes of the network apply the same criterion in selecting either the most positive or the most negative correction. Because $\delta_{AB}=-\delta_{BA}$, between any two terminals, the one matching the established criterion is preferred as a reference. In such case, the client node selects the reference, while the reference does not select anybody. In early steps of the synchronization process, each terminal synchronizes to the closest neighbor. After a while, the synchronization is propagated from terminals that never found neighbors matching the criterion, to all network members. In this manner, the process creates a dependency tree routed in the terminal having the smaller or the larger value in its tick counter when the synchronization starts. After the synchronization of neighborhood has been achieved, the tree disintegrates, as each terminal can select as direct reference any of the synchronized neighbors. If the initial root node that provided the synchronization of the network ceases to operate, any other synchronized terminal can be elected (e.g., can be substantially instantaneously elected) as reference, because all clocks in the network tick in the same time.

Although the synchronization process using this method is very fast, use of this method after the network is synchronized creates complications for controlling the drift of individual terminal oscillator.

Commercially used terminals can use low quality quartz oscillators with a drift up to 2 ppm, meaning that a terminal can drift 2 µs every second in relation with the atomic clock, or up to 4 µs in relation with another terminal. Ad-hoc selection of the synchronization server can initially be the terminal with the extreme content of the counting register. Once the synchronization is achieved, the network nodes do not need to synchronize to any other neighbor, as long as all differences between clocks are zero (meaning that they are synchronized). The oscillator drifts increase the pace of some terminals and decrease the pace of others. This makes some register counters to run faster, making the network to elect, as synchronization server, the terminal with the fastest or slowest pace, depending on adopted criterion.

Almost all terminals in an ad-hoc network are mobile. Depending on the relative moving direction, the 120 Km/h speed affects the apparent oscillator pace with up to 0.1 ppm. Thus, depending on the speed and the relative moving direction, what is seen for some terminals as "faster pacing" nodes could be seen as "slow pacing" for others. In such a scenario, the synchronization dependency graph can contain one or many loops requiring the exchange of a large number of messages for achieving and maintaining the network synchronization and from preventing network drift.

3.3.3. Perturbations

The averaging method provides network synchronization in many cases, but it may cause for some network topologies to acquire stabilization of computation when the differences between the tick counters of neighbors are unacceptably large. It happens when the sum of differences $d_{ij}$ is zero, while individual values of corrections $d_{ij}$ are of large absolute values but of opposite signs. For correcting the situation, two methods could be applied: Accelerated Convergence and Randomization, discussed below:

Accelerated Convergence

The convergence of the synchronization process can be accelerated by predicting the total correction applied to one particular terminal over an infinite number of timeframes. Let us suppose that terminal k has computed the following corrections in the last n steps: $\delta_k^{(1)}, \delta_k^{(2)}, \ldots \delta_k^{(n)}$, where $\delta_n$ is the last computed correction. Here, in order to predict what the summation of succeeding infinite number of corrections will be, these individual corrections must have some specific properties:

1. The size of corrections must be decreasing $|\delta_k^{(1)}| > |\delta_k^{(2)}| > \ldots > |\delta_k^{(n)}|$
2. All absolute values of elements of the series of the rate of decrease $\phi_k^{(i)} = |\delta_k^{(i+1)}/\delta_k^{(i)}|$ must be smaller than 0.999 (for i=1, 2, . . . , n−1).
3. The standard deviation of the absolute values of the series of rate of decrease $|\phi_k^{(i)}|$ must be smaller than 0.1.

If all these conditions are met, the terminal can compute a predicted correction, which is equal with the summation of an infinite number of further successive corrections.

The formula presented in Equation 6 computes the predicted correction after an infinite number of timeframes $\delta_k^{(\infty)}$, which is used as one time correction instead of the regular computed synchronization corrections.

$$\varphi_k = \frac{\sum_{i=1}^{n-1} \frac{\delta_k^{(i+1)}}{\delta_k^{(i)}}}{n-1}$$

$$\delta_k^{(\infty)} = \frac{\varphi_k \delta_k^{(n)}}{1-\varphi_k}$$

Equation 6

Randomized Average

If the computed synchronization correction is small, while the shifts to neighbors are large, then the synchronization correction can be computed as the pseudo-average of individual corrections. In this computation to the shift of each neighbor, is associated a random weight.

$$\delta_k^{(s')} = \frac{\sum_{\substack{i=1 \\ i \neq k}}^{n+1} \rho_i d_{k,l_k[i]}}{\sum_{\substack{i=1 \\ i \neq k}}^{n+1} \rho_i} = \frac{\sum_{\substack{i=1 \\ i \neq k}}^{n+1} \rho_i \frac{TOA_{k,l_k[i]} - TOA_{l_k[i],k}}{2}}{\sum_{\substack{i=1 \\ i \neq k}}^{n+1} \rho_i}$$

Equation 7

In Equation 7, the random weights are marked by $p_i$ and have values between zero and one. The computation of randomized average, in this regard, should be used only when the accelerated convergence fails to provide a synchronization correction, which is comparable with shifts of tick counter registers.

3.3.4. System Considerations

Any other perturbations (i.e., corrections of random values) can be also used for breaking a slow converging process.

In order for the perturbations to have the maximum effect, they should be used in the whole network during the same timeframe, such as, for example, during the first timeframe of the superframe.

4. Automatic Drift Control

Automatic Drift Control (ADC) is an optional device that preserves the synchronization of a node in relation with its neighborhood for a long duration. Utilization of this device increases the interval between synchronization sessions, thereby saving bandwidth, while preserving very precise synchronization.

After the initial synchronization has been achieved, the ADC preferably monitors the drift of the node tick counter in relation with its neighborhood, automatically correcting the content of the register with a tick from time to the time.

The ADC preferably collects data by periodically activating resynchronization sessions. The first resynchronization session can be activated, for example, one second after the synchronization has been achieved for the first time. If the correction of the tick counter, resulting from the resynchronization session, is smaller than a specified synchronization precision, then the next session can be planned after 2 seconds. During the next 2 seconds, the device automatically corrects the content of the counter register, by adding or subtracting one tick from time to time. At the end of the two seconds, a new resynchronization session can be started and, if the correction is smaller than specified synchronization precision, the time interval to the next synchronization session can be doubled again. If the correction is larger than the synchronization precision, then the previous time interval can be used for planning a new synchronization session. In this regard, as long as the corrections are small, the inter-session interval can be increased up to a predefined limit. The synchronization method utilized in the context of the present invention has the capacity to correct the real and relativistic oscillator drifts in the same time. Moreover, the method renders the operation of the TD tick counter less sensitive to network mobility.

The automatic drift control is preferably reset when the timing system identifies framing errors that are too large, which could be caused by changes in the relative movement of the network components or by the addition of new members to a network.

4.1. Hardware

Figure 10:
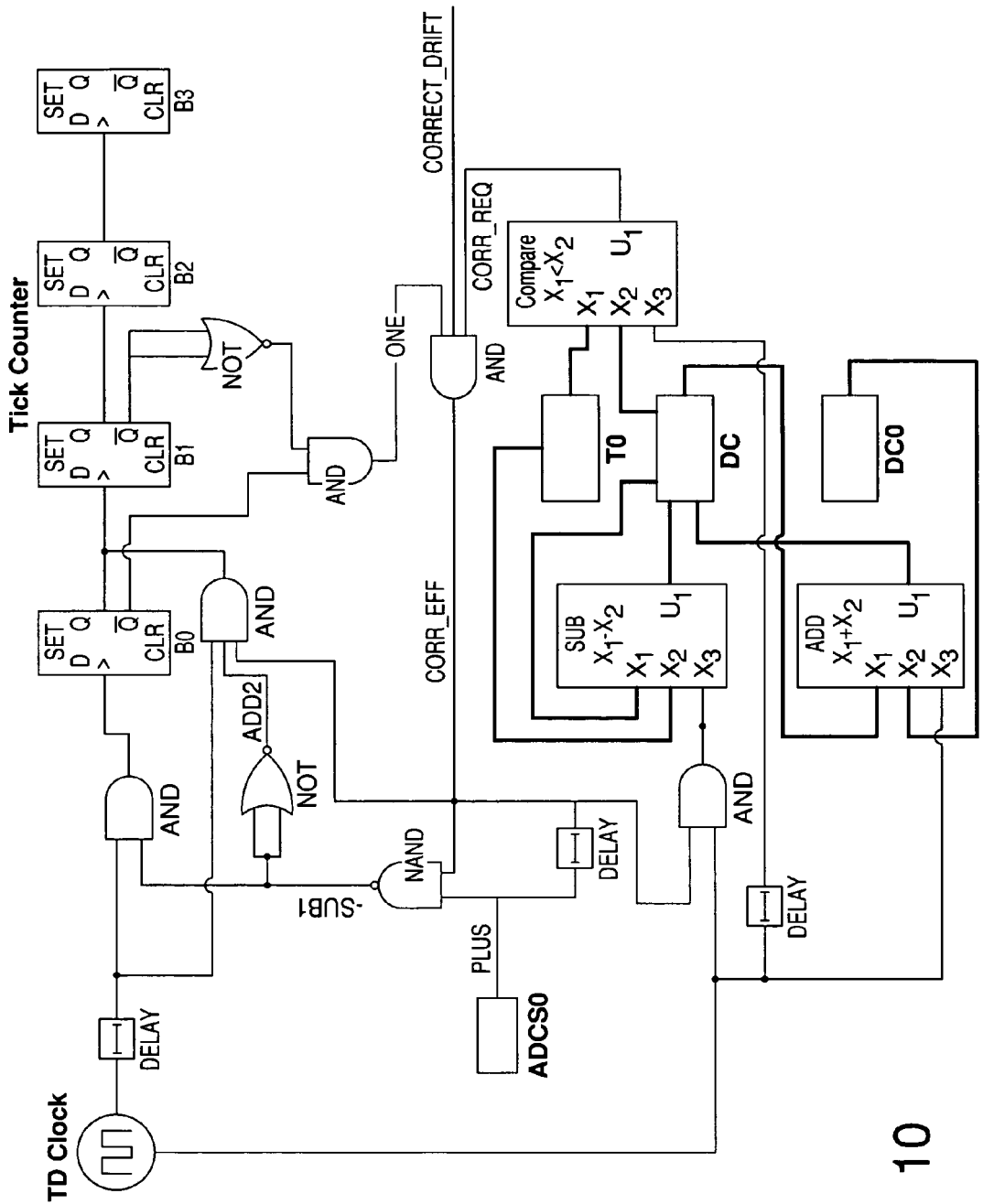
FIG. 10 is a block diagram illustrating an example of a hardware component which controls the terminal drift, in accordance with an embodiment of the present invention.

The hardware component controlling the terminal drift is illustrated in FIG. 10. The operation of the device can be controlled by the CORRECT_DRIFT signal set by a bit in a control register. Moreover, the device operation is applicable to five registers: ADCS0, T0, DC0, DC and the TD tick counter. FIG. 10, however, depicts only the four low order bits of the TD tick counter.

The sign of the automatic correction (one for positive or zero for negative) is preferably recorded by software in the ADCS0 register (automatic drift control sign). Moreover, the software preferably loads the T0 (session time) and DC0 (drift correction) registers with data collected during the synchronization sessions.

4.2. Hardware Operation

At every tick, the content of the DC0 register is preferably first added to the DC register and, then, the content of the DC register is compared with the T0 register. If DC is not larger than T0 (CORR_REQ not set), one unit is preferably added to the last bit (B0) of the tick counter. If DC is larger than the T0, bit B0 is one, and bit B1 is zero, then the correction is effective (CORR_EFF is on). In this scenario, two units are preferably added to the TD tick counter (by adding one to bit B1) if ADCS0 is one, or nothing is added if ADCS0 is zero. Moreover, while the TD tick counter is corrected, the content of T0 is subtracted from the content of DC.

It is suitable for the corrective actions to be performed every other two steps only (when bit B0 is one bit B1 is zero). This delay of the correction application is needed for preventing the device to apply a correction that can cause the TD tick counter to miss the zero value that controls the transmitter operation. It also means that in order to operate correctly, the device should not be required to perform corrections that are larger than 0.5 ticks per tick. It should not be a problem, as in normal conditions, the drift correction is smaller than 10 ppm or $10^{-5}$ ticks per tick.

5. Conclusions

Synchronization methods for Ad-hoc networks presented in this application can provide very tight synchronization, improving the operation of many ad-hoc multihopping networks. Because the method requires overhead messages for achieving and maintaining the network synchronization, it may not be very efficient for low speed networks. Low speed networks may operate more efficient by using only rough synchronization in conjunction with large inter-slot gaps.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for synchronizing a wireless network comprising a first node operable pursuant to a first time-division multiple access (TDMA) scheme and a second node operable pursuant to a second TDMA scheme, wherein the first TDMA scheme and the second TDMA scheme each comprise a plurality of ticks, and wherein the first node and the second node each comprise a tick counter for determining the time moment at which a transmission is made or at which a signal is received by the node, the method comprising:
   (i) sending from the first node a reply-requesting message to the second node;
   (ii) determining a time of arrival (TOA) of the reply-requesting message at the second node, and sending from the second node a reply message to the first node, wherein the reply message comprises information as to the determined TOA of the reply-requesting message at the second node;
   (iii) determining a TOA of the reply message at the first node;
   (iv) comparing the determined TOA values for the reply-requesting message at the second node and for the reply message at the first node, and determining a synchronization correction value; and
   (v) if the synchronization correction value is greater than a pre-determined value, applying the synchronization correction value to the tick counter of the first node, such that the tick counter of the first node is synchronized with the tick counter of the second node.

2. The method of claim 1, wherein the wireless network comprises a wireless ad-hoc peer-to-peer multi-hopping communication network in which the first and second nodes are adapted to operate.

3. The method of claim 1, wherein the first node sends the reply-requesting message to the second node when the first node encounters a timing error in relation to at least one neighboring node.

4. The method of claim 1, wherein the first node records determined synchronization correction values for a period of time and uses the record of determined synchronization correction values to predict future synchronization correction values.

5. The method of claim 1, wherein the synchronization is performed without the use of a time base.

6. The method of claim 1, wherein at least one other node also receives the reply-requesting message from the first node and sends a reply message to the first node, wherein the reply message from the at least one other node comprises information as to a determined TOA of the reply-requesting message at the at least one other node, and wherein the first node determines a TOA for the reply message at the first node from the at least one other node.

7. The method of claim 6, wherein the first node adjusts the synchronization correction value based on an averaging of the synchronization correction value determined based on the reply message received from the second node and another synchronization correction value determined based on the reply message received from the at least one other node.

8. A synchronized wireless system comprising:
a first node operable pursuant to a first time-division multiple access (TDMA) scheme; and
a second node operable pursuant to a second TDMA scheme, wherein the first TDMA scheme and the second TDMA scheme each comprise a plurality of ticks; and
wherein the first node and the second node each comprise a tick counter for determining the time moment at which a transmission is made or at which a signal is received by the node;
the first node is adapted to send a reply-requesting message to the second node;
the second node is adapted to determine a time of arrival (TOA) of the reply-requesting message, and send a reply message to the first node, wherein the reply message comprises information as to the determined TOA of the reply-requesting message at the second node;
the first node is further adapted to determine a TOA of the reply message, to compare the respective determined TOA values for the reply-requesting message at the second node and for the reply message at the first node, and to determine a synchronization correction value; and
if the first node determines that the synchronization correction value is greater than a pre-determined value, the first node applies the synchronization correction value to its tick counter, such that the tick counter of the first node is synchronized with the tick counter of the second node.

9. The system of claim 8, wherein the synchronized system is adapted to operate in a wireless ad-hoc peer-to-peer multi-hopping communication network.

10. The system of claim 8, wherein the first node is adapted to send the reply-requesting message to the second node when the first node encounters a timing error in relation to at least one neighboring node.

11. The system of claim 8, wherein the first node is adapted to record all determined synchronization correction values for a period of time and use the record of determined synchronization correction values to predict future synchronization correction values.

12. The system of claim 8, wherein at least one other node is adapted to also receive the reply-requesting message from the first node and to send a reply message to the first node, wherein the reply message from the at least one other node comprises information as to a determined TOA of the reply-requesting message at the at least one other node, and wherein the first node is adapted to determine a TOA for the reply message at the first node from the at least one other node.

13. The system of claim 11, wherein the first node is adapted to adjust the synchronization correction value based on an averaging of the synchronization correction value determined based on the reply message received from the second node and another synchronization correction value determined based on the reply message received from the at least one other node.

14. A node, which is adapted for use in a wireless network and to synchronize with a second node in the wireless network, wherein the node is operable pursuant to a first time-division multiple access (TDMA) scheme and the second node is operable pursuant to a second TDMA scheme, wherein the first TDMA scheme and the second TDMA scheme each comprise a plurality of ticks, and wherein the node and the second node each comprise a tick counter for determining the time moment at which a transmission is made or at which a signal is received by the node, the node comprising:
a controller, adapted to control the node to perform the following operations:
send a reply-requesting message to the second node, wherein the second node determines a time of arrival (TOA) of the reply-requesting message at the second node and sends a reply message to the first node, wherein the reply message comprises information as to the determined TOA of the reply-requesting message at the second node;
determine a TOA of the reply message at the node;
compare the determined TOA values for the reply-requesting message at the second node and for the reply message at the node, and determine a synchronization correction value; and
if the synchronization correction value is greater than a pre-determined value, apply the synchronization correction value to the tick counter of the node, such that the tick counter of the node is synchronized with the tick counter of the second node.

15. The node of claim 14, wherein the wireless network includes a wireless ad-hoc peer-to-peer multi-hopping communication network in which the node and second node are adapted to operate.

16. The node of claim 14, wherein the controller is further adapted to control the node to send the reply-requesting message to the second node when the node encounters a timing error in relation to at least one neighboring node.

17. The node of claim 14, wherein:
the controller is further adapted to control the node to record all determined synchronization correction values for a period of time and uses the record of determined synchronization correction values to predict future synchronization correction values.

18. The node of claim 14, wherein the synchronization is performed without the use of a time base.

19. The node of claim 14, wherein:
at least one other node also receives the reply-requesting message from the node and sends a reply message to the node, wherein the reply message from the at least one other node comprises information as to a determined TOA of the reply-requesting message at the at least one other node; and
wherein the controller is further adapted to determine a TOA for the reply message at the node from the at least one other node.

20. The node of claim 19, wherein:
the controller is further adapted to adjust a synchronization correction value based on an averaging of the synchronization correction value determined based on the reply message received from the second node and another synchronization correction value determined based on the reply message received from the at least one other node.

\* \* \* \* \*